United States Patent [19]

Lailach

[11] 4,038,364

[45] July 26, 1977

[54] REDUCTION OF IRON IN TITANIUM ORE

[75] Inventor: Günter Lailach, Krefeld, Germany

[73] Assignee: Bayer Aktiengesellschaft, Leverkusen, Germany

[21] Appl. No.: 537,622

[22] Filed: Dec. 30, 1974

[30] Foreign Application Priority Data

Jan. 25, 1974 Germany .............................. 2403458

[51] Int. Cl.² ...................... C01G 23/04; C01G 23/08; B01D 11/02
[52] U.S. Cl. ....................................... 423/86; 423/80; 423/82; 423/610
[58] Field of Search ...................... 423/86, 74, 80, 82, 423/580

[56] References Cited

U.S. PATENT DOCUMENTS

| | | | |
|---|---|---|---|
| 2,127,247 | 8/1938 | Dawson | 423/86 |
| 3,291,599 | 12/1966 | Reeves | 423/74 |
| 3,305,312 | 2/1967 | Weinstein et al. | 423/580 X |
| 3,660,029 | 5/1972 | Naguib | 423/80 |
| 3,929,963 | 12/1975 | Kurata et al. | 423/74 X |

*Primary Examiner*—Edward Stern
*Attorney, Agent, or Firm*—Burgess, Dinklage & Sprung

[57] ABSTRACT

In the production of synthetic rutile from a titanium and iron-containing ore by reducing most of the iron(III) in said ore into iron(II) with a steam-containing gaseous reducing agent at a temperature of about 850° to 1100° C, followed by leaching to remove the iron(II) and iron(III) and drying of the residue, the improvement which comprises using as said reducing agent a gas containing hydrogen and steam and optionally at least one of CO and $CO_2$ wherein the $H_2 + CO : H_2O + CO_2$ molar ratio of the reducing agent is between 0.36 and 1.8. The reducing agent may comprise a mixture of hydrogen and steam or it may be the partial combustion product of a hydrocarbon. Advantageously, the ore is oxidized at 550° to 1200° C prior to reduction. The reduction permits ready dissolution of the iron during leaching without risk of hydrogen evolution.

12 Claims, No Drawings

REDUCTION OF IRON IN TITANIUM ORE

This invention relates to a process for the production of synthetic rutile from iron and titanium-containing ores.

It is known that titanium and iron-containing ores can be partly reduced, i.e., the iron component can be converted from the trivalent to the divalent state, with solid or gaseous reducing agents, optionally after having been previously roasted under oxidizing conditions. In cases where coke is used, as in German Published Specification DOS No. 2,005,832, it is easier than in cases where hydrogen is used, as in German Published Specification DOS No. 1,758,261, to control the reaction in such a way that only a little metallic iron is formed. In order as far as possible to prevent the formation of metallic iron which presents hazards during leaching due to the evolution of hydrogen, it has been proposed in German Published Specifications Nos. 2,038,191; 2,038,245 and 2,038,246 and in South African Pat. No. 713.018 to carry out the partial reduction stage using hydrogen containing from 1 to 7% by volume of steam along with hydrocarbon or with partly burnt hydrocarbons.

According to South African Pat. No. 713,018, the gas used for partial reduction must have a molar ratio of $H_2 + CO : H_2O + CO_2$ of more than 2 if an adequate reaction velocity is to be obtained.

However, where only at most 5% of the iron is present as trivalent iron after reduction, the ore partly reduced by these methods and the ore partly reduced with coke actually contains as much as 5% of the iron in the form of metallic iron, with the result that corresponding safety measures have to be taken during leaching.

It has now been found that synthetic rutile can be obtained from titanium and iron-containing ores, optionally preoxidized at temperatures in the range of about 550° to 1200° C, by largely reducing the iron (III) into iron (II) with steam-containing, gaseous reducing agents at temperatures in the range of about 850° to 1100° C, followed by leaching to remove the iron (II) and iron (III) and drying of the residue, providing the reducing gas contains hydrogen and steam, and optionally at least one of CO and $CO_2$, a molar ratio of $H_2 + CO : H_2O + CO_2$ of from 0.36 to 1.8 being maintained during reduction.

According to the prior art, further dilution of the reduction gas with steam had not been expected to give an adequate reduction rate or to provide for reduction of most of the iron (III) into iron (II).

However, it has surprisingly been found that the partial reduction stage takes place at a satisfactory rate at temperatures above 850° C with reducing gases containing $H_2O$ or $H_2O + CO_2$ in much larger quantities than the maximum levels permitted in the past, and that, where the conditions according to the invention are applied, no metallic iron is formed even in the event of prolonged residence of the iron under the reaction conditions. Providing at most 5% of the iron is still in oxidation stage III the ores reduced in accordance with the invention can be leached very effectively. There are less $TiO_2$-fines formed during leaching than in the case of samples that have been reduced by conventional processes.

Sand-like oxidic titanium and iron-containing ores (ilmenites in short) with grain sizes of about 40 to 400 μm are preferably used as the ores.

Ores that have undergone very little weathering are preferably subjected to artificial weathering by roasting under oxidizing conditions at temperatures of from 550° to 1200° C in a preliminary stage preceding partial reduction, becuase partial reduction proceeds more favorably, the more weathered the ores, i.e. the greater the ratio of $Fe^{3+}$ to $Fe^{2+}$.

The reducing gases which may be used include hydrogen-water mixtures, partly burnt natural gas or other partly burnt gaseous or liquid hydrocarbons. Steam can be added during the burning of liquid hydrocarbons in order to increase the hydrogen content of the reducing gas. For reduction with hydorgen-water mixtures, constant reduction yields of iron (II) were obtained with the $H_2:H_2O$ molar ratios quoted in the Table in dependence upon the temperature and residence time without any metallic iron being obtained. Providing sufficient quantities of gas are used, as much as 95% of the iron is present in the form of $Fe^{2+}$ after the minimum times quoted in each case. Any increase in the residence times is accompanied by an increase in the iron (II) content of the total iron up to 99%. Reduction is preferably carried out with an $H_2:H_2O$ molar ratio of from 1.25 to 1.8. The reduction time is advantageously in the range from 10 to 60 minutes, depending upon temperature. At temperatures in the preferred range from 950° to 1100° C, the reduction times are less than 15 minutes. The following Table shows the maximum $H_2:H_2O$ molar ratios and minimum residence times in dependence upon the particular temperature.

| Reaction temperature (° C) | Maximum molar ratio $H_2 : H_2O$ in the reducing gas | Minimum residence time of the ore under reducing conditions (minutes) |
| --- | --- | --- |
| 850 | 1.8 | 60 |
| 900 | 1.67 | 30 |
| 950 | 1.56 | 10 |
| 1000 | 1.45 | 10 |
| 1000 | 1.28 | 10 |

In cases where natural gas or other hydrocarbons are used, about 55 to 80% and preferably about 55 to 70% of the quantity of oxygen required for their complete combustion should be used for producing the reaction gas mixture of $H_2$, CO, $H_2O$ and $CO_2$. Pure oxygen, oxygen-containing gases or, preferably, air can be used for oxidation. The molar ratio $H_2 + CO : H_2O + CO_2$ prevailing under these conditions is less than 2, preferably amounting to between 0.65 and 1.5. The reduction times at temperatures in the preferred range from about 950° to 1100° C and with molar ratios in the preferred range from 0.65 to 1.5 are less than 30 minutes. Even with a molar ratio of 0.36, the reduction time need be no longer than 1 hour.

In cases where $H_2/H_2O$ mixtures are used, it is advantageous for some of the hot steam escaping from the reduction apparatus to be returned to the apparatus together with fresh hydrogen.

The reducing gases can be diluted by inert gases, more especially by nitrogen which can enter the gas mixture, for example, by partial combustion with air.

Partial reduction is preferably carried out at temperatures in the range from about 950° to 1100° C. The partly reduced ore is cooled to below 300° C in the absence of air.

It is of advantage to transfer the ore directly from the oxidizing roasting stage to the reduction apparatus which is preferably in the form of a fluidized-bed apparatus.

Leaching is carried out with hydrochloric acid containing about 17 to 22% by weight and preferably about 18 to 20% by weight of HCl at temperatures between 80° C and boiling temperature. The acid excess should contribute about 30 to 70% and preferably about 50 to 60% of the quantity of acid required for dissolving the soluble metal oxides in the ore. In cases where leaching is carried out as a single-stage operation, i.e. in batches, the leaching time required to obtain a $TiO_2$ content of at least 90% in the synthetic rutile is about 2 to 5 hours.

Leaching is preferably carried out in fluidized-bed apparatus because very little abrasion occurs by virtue of the mild treatment. The leaching time and the content of fines below 40 μm are considerably less with ores activated in accordance with the invention than with ores still containing more than 5% of the iron in the form of trivalent iron for example in accordance with the process described in German Published Specification DOS No. 2,216,209. In particular, the content of fine particle component is even smaller than it is in the leaching of activated ores containing metallic iron. However, the activated ore can also be leached more effectively with sulfuric acid or spent sulfuric acid from the sulfate process for the production of titanium dioxide than conventionally activated ore containing either metallic iron or considerable quantities of trivalent iron.

The washed leaching residue is calcined at about 750° to 1100° C preferably at about 800° to 850° C, to form synthetic rutile. The resulting synthetic rutile is a sand-like product containing about 90 to 98% of $TiO_2$ which is eminently suitable for the production of titanium tetrachloride and as a material for welding electrodes or for catalysts.

Accordingly, the advantages of the invention are as follows:

Depending upon the ore used, a high-grade synthetic rutile containing more than 90% of $TiO_2$ can be obtained by an extremely reliable process, in which at least 95% of the iron is quickly, i.e. during less than 60 minutes, reduced into the divalent state with gas mixtures according to the invention and in the temperature range according to the invention, without any metallic iron being formed. In addition, the activated ores can be effectively leached relatively quickly with only a very small content of fines present in the leaching residue.

The invention is illustrated by the following Examples.

EXAMPLE 1

Sand-like ilmenite containing 54.8% or $TiO_2$, 19.6% of FeO, 21.6% of $Fe_2O_3$ and 1.6% of MnO, was roasted under oxidizing conditions at 1000° C with flue gas containing 7.4% by volume of $O_2$. The roasted material contained 98% of the iron in the form of $Fe^{3+}$. The material was then reduced at 950° C in a fluidized-bed reactor with a gas mixture corresponding to an $H_2:H_2O$ molar ratio of 1.5. Despite the shallow depth of the bed (15 cm), the consumption of $H_2$ in the first 7 to 8 minutes was in excess of 95%. After 10 minutes, 95% of the iron was in the form of $Fe^{2+}$. Metallic iron could not be detected. After a residence time of 30 minutes under the reduction conditions, 99% of the iron was in the form of $Fe^{2+}$. It was not possible to detect any metallic iron either after a residence time of 30 minutes or after 120 minutes. The test samples were leached in a fluidized-bed apparatus at 105° C with 20% hydrochloric acid used in an excess of 55%, based on the quantity stoichiometrically required for dissolving the acid-soluble constituents of the ore. Leaching was stopped after 3 hours. The brine contained 102 g of Fe per liter. 0.7% by weight of the solid leaching residue was sifted off as fines (below 40 μm). The washed residue was calcined at 800° C. It contained 98% by weight of $TiO_2$.

EXAMPLE 2

Oxidized ilmenite was reduced at 1000° C with a gas mixture which had been obtained by burning natural gas with air in a ratio by volume of 1:6 and which corresponded to an $H_2 + CO : H_2O + CO_2$ mole ratio of 1.04. After a residence time of 20 minutes 96% of the iron was in the form of $Fe^{2+}$. It was not possible to detect any metallic iron. The material was leached in the same way as in Example 1. The fines amounted to less than 0.5% by weight.

It will be appreciated that the instant specification and examples are set forth by way of illustration and not limitation, and that various modifications and changes may be made without departing from the spirit and scope of the present invention.

What is claimed is:

1. In the production of synthetic rutile from a titanium and iron-containing ore by reducing most of the iron (III) in said ore into iron (II) with a steam-containing gaseous reducing agent at a temperature of about 850° to 1100° C, followed by leaching to remove the iron (II) and iron (III) and drying of the residue, the improvement which comprises using as said reducing agent hydrogen optionally containing CO, the gas in addition optionally containing $CO_2$, the molar ratio of the $H_2$ + any CO present: $H_2O$ + any $CO_2$ present ranging between 0.36 and 1.8. whereby substantially no metallic iron is produced during reduction and substantially no hydrogen is produced during leaching.

2. A process as claimed in claim 1, wherein reduction is carried out at a temperature of about 950° to 1100° C.

3. A process as claimed in claim 1, wherein reduction is carried out with a mixture of hydrogen and steam at a $H_2:H_2O$ molar ratio of 1.25 to 1.8.

4. A process as claimed in claim 1, wherein reduction is carried out with a partly burnt gaseous or liquid hydrocarbon containing hydrogen, steam, carbon monoxide and carbon dioxide at a $H_2 + CO:H_2O + CO_2$ molar ratio of 0.65 to 1.5.

5. A process as claimed in claim 4, wherein the gaseous reducing agent is the product of burning the hydrocarbon with about 55 to 80% of the quantity of oxygen required for complete combustion.

6. A process as claimed in claim 5, wherein steam is additionally added during partial combustion.

7. A process as claimed in claim 1, wherein the gaseous reducing agent is mixed with at least one inert gas.

8. A process as claimed in claim 1, wherein the reduced ore is leached with mineral acid.

9. A process as claimed in claim 8, wherein the leaching agent is 17 to 22% by weight HCl and is used in about 130 to 170% of the stoichiometrically necessary quantity.

10. A process as claimed in claim 8, wherein leaching is carried out in a single stage over a period of about 2 to 5 hours.

11. A process as claimed in claim 8, wherein the solid leaching residue is calcined at about 750° to 1100° C.

12. A process as claimed in claim 2, wherein the reduced ore is leached in a single stage over a period of about 2 to 5 hours with 17 to 22% by weight HCl in about 150 to 160% of the stoichiometrically necessary quantity, and the solid leaching residue is calcined to about 800° to 850° C.

* * * * *